(12) United States Patent
Matsuoka

(10) Patent No.: US 11,196,938 B2
(45) Date of Patent: Dec. 7, 2021

(54) IMAGE PROCESSING APPARATUS AND CONTROL METHOD FOR SAME

(71) Applicant: CANON KABUSHIKI KAISHA, Tokyo (JP)

(72) Inventor: Narumi Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 16/858,248

(22) Filed: Apr. 24, 2020

(65) Prior Publication Data

US 2020/0344400 A1    Oct. 29, 2020

(30) Foreign Application Priority Data

Apr. 26, 2019 (JP) .............................. JP2019-085797

(51) Int. Cl.
*H04N 5/235* (2006.01)
*H04N 5/232* (2006.01)

(52) U.S. Cl.
CPC ..... *H04N 5/2355* (2013.01); *H04N 5/232933* (2018.08); *H04N 5/232941* (2018.08)

(58) Field of Classification Search
CPC ............. H04N 5/232; H04N 5/232122; H04N 5/23222; H04N 5/23245; H04N 5/232933; H04N 5/232941; H04N 5/2351; H04N 5/2353; H04N 5/2355; H04N 9/045; H04N 9/64
See application file for complete search history.

(56) References Cited

U.S. PATENT DOCUMENTS

| | | | |
|---|---|---|---|
| 11,039,074 B1* | 6/2021 | Manzari | H04N 5/232935 |
| 2017/0251189 A1* | 8/2017 | Tsukagoshi | H04N 5/20 |
| 2017/0332060 A1* | 11/2017 | Chan | H04N 5/23218 |
| 2018/0284979 A1* | 10/2018 | Choi | H04N 5/23293 |
| 2019/0235743 A1* | 8/2019 | Ono | H04N 5/23216 |
| 2019/0281201 A1* | 9/2019 | Stauder | G06K 9/00664 |
| 2020/0059605 A1* | 2/2020 | Liu | H04N 5/23245 |

FOREIGN PATENT DOCUMENTS

JP    2014-167609 A    9/2014

* cited by examiner

*Primary Examiner* — Amy R Hsu
(74) *Attorney, Agent, or Firm* — Cowan, Liebowitz & Latman P.C.

(57) ABSTRACT

An image processing apparatus acquires a high dynamic range (HDR) signal generated in compliance with an HDR standard, detects a region for which a highlight alarm indication is to be provided, by applying a threshold to the HDR signal, and provides a highlight alarm indication for the detected region. The HDR standard is a standard in which luminance values are handled as absolute values, and the region is detected by applying a threshold that is based on a possible maximum value of the HDR signal.

14 Claims, 8 Drawing Sheets

F I G. 8A
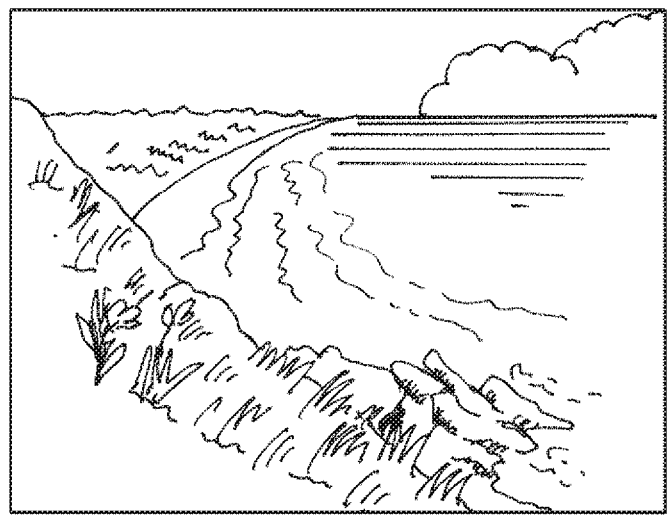
F I G. 8B
F I G. 8C
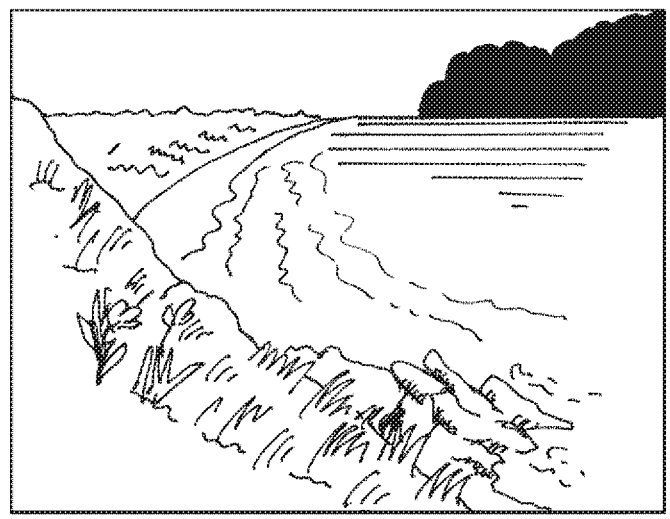

IMAGE PROCESSING APPARATUS AND CONTROL METHOD FOR SAME

BACKGROUND OF THE INVENTION

Field of the Invention

The present invention relates to an image processing apparatus and a control method for the image processing apparatus, and particularly relates to a technique regarding the handling of a high dynamic range (HDR) signal.

Description of the Related Art

Due to the improvement in the performance of light-emitting elements (LEDs for example), etc., display apparatuses that are capable of directly displaying HDR images having a wider luminance dynamic range than conventional images have been realized. Such display apparatuses are capable of performing displaying while making the most of the luminance dynamic range (D range) of HDR images, and thus are capable of displaying, with higher fidelity, images having colors and details in the high luminance range that could not be represented with a conventional D range (standard dynamic range (SDR)).

While HDR has higher tolerance against blown-out highlights than SDR does, blown-out highlights can occur in HDR. The tone in a region that has become a blown-out highlight cannot be restored, and thus, it is desirable for a region that will become a blown-out highlight also in HDR displaying to be recognizable when capturing is performed, for example. Among SDR image-capturing devices, a technique (zebra indication) for displaying a stripe pattern (zebra pattern) in a superimposed state on pixels whose luminance exceeds a threshold is known (Japanese Patent Laid-Open No. 2014-167609).

However, in an absolute luminance-based HDR standard, there are cases in which the maximum luminance that can be output differs depending on gamma curve shape. Due to this, there are cases in which an appropriate alarm indication cannot be realized by adopting a method, such as the zebra indication in SDR, in which a pixel whose luminance exceeds a fixed threshold is extracted as a pixel that will become a blown-out highlight.

SUMMARY OF THE INVENTION

The present invention has been made in view of such problems of conventional techniques, and an image processing apparatus that makes a region in which display luminance will be high in an HDR image appropriately recognizable and a control method for the image processing apparatus are each provided as one aspect of the present invention.

According to an aspect of the present invention, there is provided an image processing apparatus comprising: one or more processors that execute a program stored in a memory and thereby functions as: an acquiring unit configured to acquire a high dynamic range (HDR) signal generated in compliance with an HDR standard; a detecting unit configured to detect a region for which a highlight alarm indication is to be provided, by applying a threshold to the HDR signal; and a display controlling unit configured to provide a highlight alarm indication for the region detected by the detecting unit, wherein the HDR standard is a standard in which luminance values are handled as absolute values, and wherein the detecting unit applies a threshold that is based on a possible maximum value of the HDR signal.

According to another aspect of the present invention, there is provided a method for controlling an image processing apparatus, comprising: acquiring an HDR signal generated in compliance with an HDR standard; detecting a region for which a highlight alarm indication is to be provided, by applying a threshold to the HDR signal; and providing a highlight alarm indication for the region detected by the detecting, wherein the HDR standard is a standard in which luminance values are handled as in absolute values, and wherein in the detecting, a threshold that is based on a possible maximum value of the HDR signal is applied.

According to a further aspect of the present invention, there is provided a non-transitory computer-readable medium having stored therein a program for making a computer function as an image processing apparatus comprising: one or more processors that execute a program stored in a memory and thereby functions as: an acquiring unit configured to acquire a high dynamic range (HDR) signal generated in compliance with an HDR standard; a detecting unit configured to detect a region for which a highlight alarm indication is to be provided, by applying a threshold to the HDR signal; and a display controlling unit configured to provide a highlight alarm indication for the region detected by the detecting unit, wherein the HDR standard is a standard in which luminance values are handled as absolute values, and wherein the detecting unit applies a threshold that is based on a possible maximum value of the HDR signal.

Further features of the present invention will become apparent from the following description of exemplary embodiments (with reference to the attached drawings).

BRIEF DESCRIPTION OF THE DRAWINGS

FIGS. 8A to 8C are schematic diagrams relating to the provision of a highlight alarm indication to an HDR signal.

DESCRIPTION OF THE EMBODIMENTS

Figure 1:
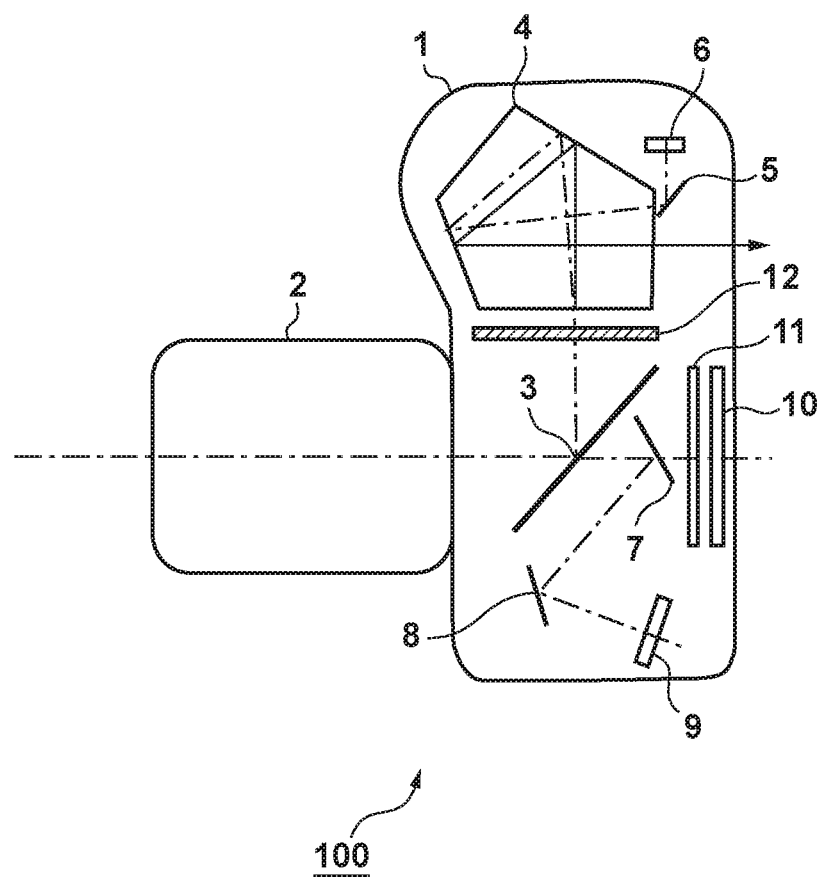
FIG. 1 is a cross-sectional view of a digital camera serving as one example of an image processing apparatus pertaining to the embodiments.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Exemplary embodiments of the present invention will now be described in detail in accordance with the accompanying drawings. Note that the embodiments that will be described are merely examples and do not limit the scope of the present invention. In the following, embodiments in which the present invention is applied to a digital camera will be described for example. However, a digital camera is merely one example of an image processing apparatus to which the present invention is applicable. The present invention can be implemented in any desired electronic device. Such electronic devices include personal computers, tablet terminals, portable telephones, game machines, drive recorders, robots, drones, etc., as well as image capture apparatuses such as digital cameras and digital video cameras. However, there is no limitation to such devices.

First Embodiment

FIG. 1 is a cross-sectional diagram illustrating an example of an arrangement of the main optical members, sensors, etc., of a digital camera (hereinafter referred to as "camera") 100 pertaining to the embodiments. The camera 100 includes a camera main body 1 and an interchangeable lens 2. Note that the present invention is generally applicable to cameras in which image sensors are used, and is not dependent on the use of the camera or structural differences such as whether or not lenses are interchangeable and whether or not a mirror box is included. The present invention is also applicable to cameras built into smartphones and cameras for use in medical devices, industrial devices, automobiles, etc. The image sensor 10 in the camera main body 1 is a CMOS image sensor or a CCD image sensor, for example, and a plurality of pixels (photoelectric conversion elements) are arrayed in the image sensor 10. The image sensor 10 is also provided with peripheral circuits, such as an amplification circuit, for processing signals obtained from the pixels. The mechanical shutter 11 provided near the front of the image sensor 10 controls the exposure timing and exposure time of the image sensor 10.

The main mirror 3 and the first reflection mirror 7 arranged behind the main mirror 3 move upward during capturing so as not to block light traveling from the interchangeable lens 2 toward the image sensor 10. At least a part of the main mirror 3 is a half mirror, and the first reflection mirror 7 reflects light passing through the main mirror 3. The second reflection mirror 8 further reflects the light reflected by the first reflection mirror 7, and causes the light to be incident on the focus detection sensor (AF sensor) 9. For example, the AF sensor 9 may be an image sensor having a smaller number of pixels than the image sensor 10.

The first reflection mirror 7, the second reflection mirror 8, and the AF sensor 9 are structures for performing focus detection according to the phase difference detection method at any position within a capturing screen. The photometric sensor (AE) sensor 6 receives an image of a capturing screen reflected by the pentaprism 4 and the third reflection mirror 5. The light-receiving unit of the AE sensor 6 is divided into a plurality of regions, and the AE sensor 6 can output luminance information of a photographic subject for each region. The number in which the light-receiving unit is divided is not limited and may also be dynamically changed.

The pentaprism 4 constitutes a finder optical system. A photographic subject image reflected by the pentaprism 4 can be observed through an eyepiece. Part of the light that is reflected by the main mirror 3 and that is diffused by the focusing plate 12 is incident on the AE sensor 6. The interchangeable lens 2 is electrically connected to the camera main body 1 via contacts in a lens mount provided on the camera main body 1, and receives the supply of power from the camera main body 1 and communicates with the camera main body 1. Note that the AE sensor 6 and the AF sensor 9 cannot be used during live-view displaying and while a moving image is being recorded because the main mirror 3 is moved upward. Due to this, exposure control and focus adjustment control are performed by using information that can be obtained from images captured by the image sensor 10.

Figure 2:
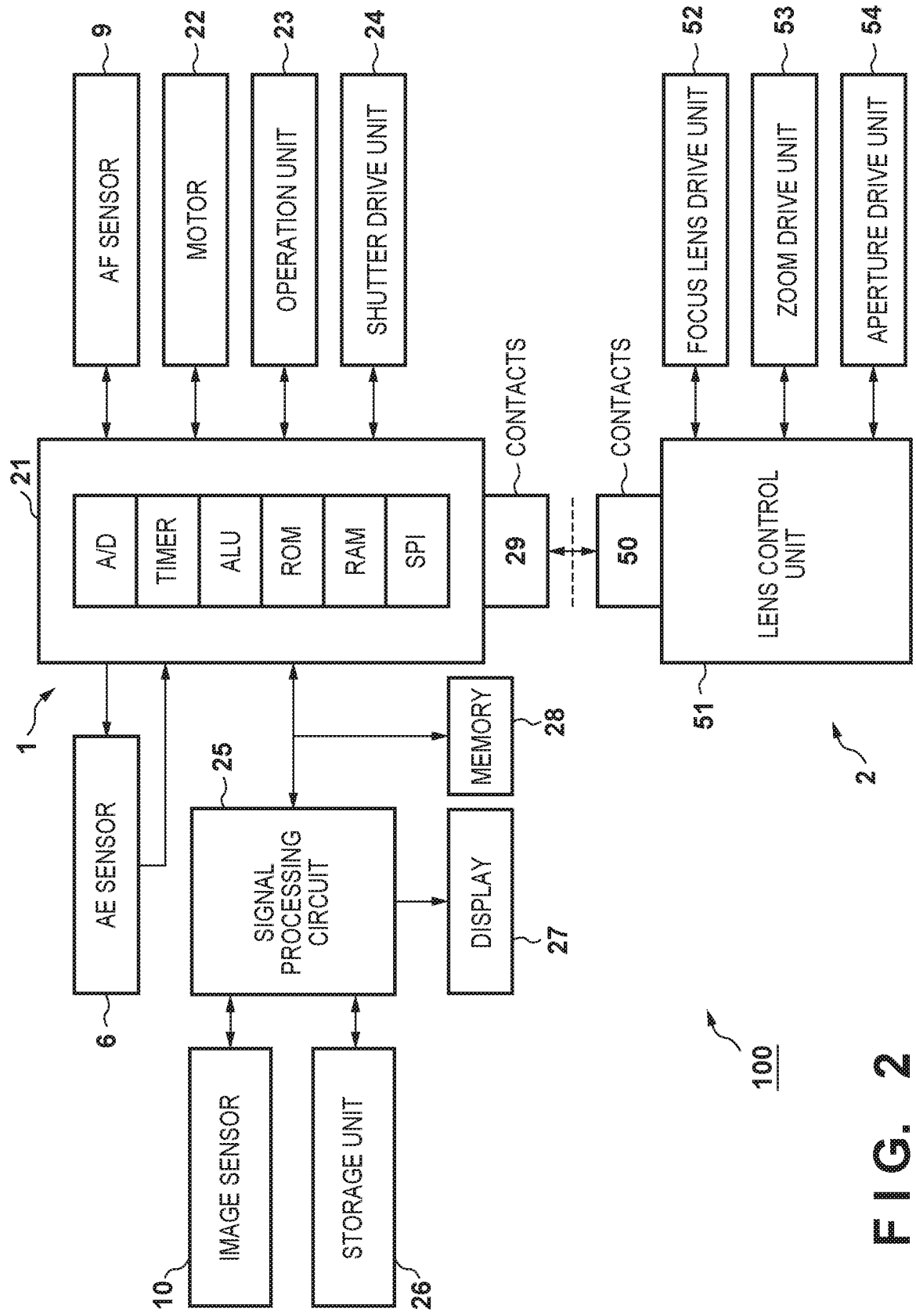
FIG. 2 is a block diagram illustrating an example of a functional configuration of the digital camera illustrated in FIG. 1.

FIG. 2 is a block diagram illustrating an example of a configuration of electric circuits of the camera main body 1 and the interchangeable lens 2 for the camera main body 1, which are illustrated in FIG. 1. In the camera main body 1, the control unit 21 is a one-chip microcomputer in which an arithmetic and logic unit (ALU), a ROM, and a RAM, and an A/D converter, a timer, a serial communication port (SPI), etc., are built in, for example. For example, the control unit 21 controls the operations of the camera main body 1 and the interchangeable lens 2 by loading a program stored in the ROM into the RAM and executing the program. The specific operations of the control unit 21 will be described in the following.

Signals output from the AF sensor 9 and the AE sensor 6 are input to an A/D converter input terminal of the control unit 21. The signal processing circuit 25 controls the image sensor 10 according to instructions from the control unit 21, and generates RAW image data by performing preprocessing such as noise reduction processing and A/D conversion on pixel signals output by the image sensor 10. Furthermore, the signal processing circuit 25 generates an image signal (image data) by applying developing processing such as color interpolation and white balance processing on the RAW image data. In addition, the signal processing circuit 25 performs necessary image processing, such as compression and compositing, when recording the image signal that is obtained.

The memory 28 is a DRAM, etc., and is used as a work memory when the signal processing circuit 25 performs various types of signal processing and is used as a VRAM when an image is displayed on the display 27 described in the following. The display 27 is a rear-surface liquid-crystal display of the camera main body 1 or an external display, and displays information such as setting values of the camera 100, messages, GUIs such as a menu screen, captured images, etc. The display 27 is capable of HDR display. The display 27 is controlled by instructions from the control unit 21. The storage unit 26 is a semiconductor memory card, for example. An image signal to be recorded (moving image- or still image-data) is recorded as a data file of a predetermined format to the storage unit 26 by the signal processing circuit 25.

The motor 22, in accordance with control by the control unit 21, moves the main mirror 3 and the first reflection mirror 7 up and down and charges the mechanical shutter 11. The operation unit 23 is a group of input devices such as switches that a user uses to operate the camera 100. The operation unit 23 includes a release switch for starting a capturing preparation operation and for providing an instruction to start capturing, a capturing mode selection switch for selecting a capturing mode, one or more directional keys, an enter key, etc. The contacts 29 are provided in the lens mount, and comes into contact with a lens-side contacts 50 when the interchangeable lens 2 is attached. The contacts 29 are used for the supply of power to the interchangeable lens 2 and for the communication with the interchangeable lens 2, and input/output terminals of the serial communication port of the control unit 21 are connected to the contacts 29. The shutter drive unit 24 is connected to an output terminal of the control unit 21, and drives the mechanical shutter 11.

The contacts 50, which form a pair with the contacts 29, are provided on the interchangeable lens 2. The lens control unit 51, which is a one-chip microcomputer similar to the control unit 21, is connected to the contacts 50. The lens control unit 51 is capable of communicating with the control unit 21 of the camera main body 1 via the contacts 50. The lens control unit 51 includes a microprocessor, a ROM, and a RAM, for example, and the lens control unit 51 controls the operation of the interchangeable lens 2 based on instructions from the control unit 21 by loading a program stored in the ROM into a RAM and executing the program. Setting values of the camera 100, GUI data, etc., are also stored in the ROM. Furthermore, the lens control unit 51 notifies the control unit 21 of information such as the state of the interchangeable lens 2. The focus lens drive unit 52 is connected to an output terminal of the lens control unit 51, and drives a focus lens. The zoom drive unit 53, in accordance with control by the lens control unit 51, changes the angle of view of the interchangeable lens 2. The aperture drive unit 54, in accordance with control by the lens control unit 51, adjusts the opening amount of an aperture.

When the interchangeable lens 2 is attached to the camera main body 1, the contacts 29 and 50 come in contact with one another. Due to this, the lens control unit 51 and the control unit 21 of the camera main body 1 are electrically connected, and data communication can be performed. Furthermore, power for driving a motor and actuators inside the interchangeable lens 2 is also supplied from the main body 1 via the contacts 29 and 50. Optical information specific to the lens that the control unit 21 needs to perform focus detection and exposure calculation, information regarding a photographic subject distance based on a distance encoder, etc., are supplied from the lens control unit 51 to the control unit 21 by means of data communication. Also, focus adjustment information and aperture information obtained through the focus detection processing and the exposure calculation processing performed by the control unit 21 are supplied from the control unit 21 to the lens control unit 51 by means of data communication. The lens control unit 51 drives the focus lens in accordance with the focus adjustment information, and controls the opening amount of the aperture in accordance with the aperture information.

In the following, specific operations from capturing to developing in a first embodiment will be described. When the control unit 21 becomes capable of operating due to a power switch included in the operation unit 23 illustrated in FIG. 2 being turned on, etc., the control unit 21 executes initialization processing. In the initialization processing, the control unit 21 acquires lens information necessary for focus detection and exposure calculation from the lens control unit 51 of the interchangeable lens 2. When the initialization processing is completed, the control unit 21 executes operations to be executed in a capturing standby state. In the capturing standby state, the control unit 21 realizes live-view displaying by continuously executing the capturing of a moving image and the displaying of the moving image that is shot, for example. Furthermore, the control unit 21 monitors the operation unit 23, and executes processing corresponding to user operations performed on the operation unit 23.

For example, if a half-press operation on the release switch included in the operation unit 23 is detected, the control unit 21 executes processing for preparing for the capturing of a still image. The capturing preparation processing includes autofocus (AF) processing, automatic exposure (AE) processing, etc. In addition, if a full-press operation on the release switch is detected, the control unit 21 executes processing for capturing a still image. In the capturing processing, the operation of the mechanical shutter 11 is controlled and the position of the focus lens is adjusted based on the results of the focus detection processing and the exposure calculation obtained through the capturing preparation processing.

When the exposure of the image sensor 10 to light is finished and pixel signals are read out, developing processing is performed on RAW image data in the signal processing circuit 25. In the camera 100 according to the present embodiment, a setting can be made of whether to record the image obtained by capturing as an SDR image or as an HDR image. If a setting is made to record an SDR image, the signal processing circuit 25 executes the developing processing by using parameters for SDR and generates 8-bit SDR image data. Furthermore, if a setting is made to record an HDR image, the signal processing circuit 25 executes the developing processing by using parameters for HDR and generates 10-bit HDR image data. Here, "8-bit" and "10-bit" refer to the bit depths of the color components (R, G, B). Note that the RAW image data may be recorded, and the developing processing may be applied afterwards.

Figure 4A:
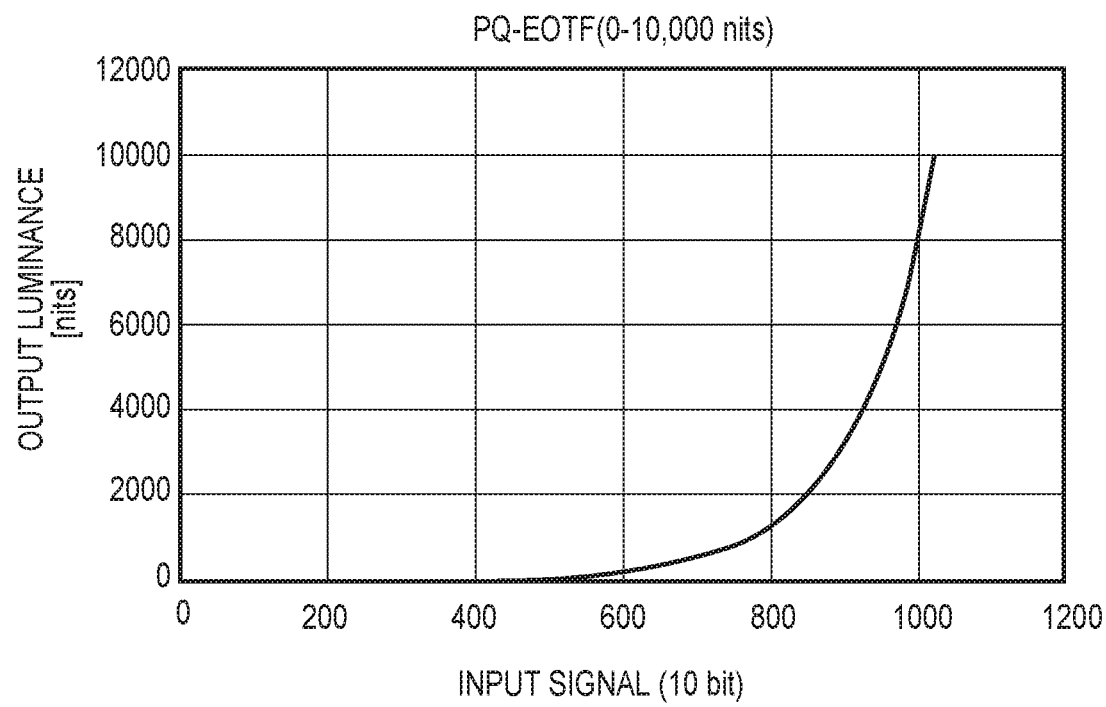
FIGS. 4A and 4B are diagrams illustrating EOTF characteristics of Perceptual Quantization (PQ) and an example of input/output characteristics for individual sensitivities.

Signal characteristics indicating the relationship between video signal levels and display luminance in HDR images are defined by electro-optical transfer functions (EOTFs). Furthermore, there are two EOTFs, namely Perceptual Quantization (PQ) standardized by SMPTE ST 2084 and Hybrid Log Gamma (HLG) standardized by ARIB STD-B67. In HLG, display luminance is indicated in relative values similarly to in SDR, and thus the maximum display luminance (display peak luminance) changes depending on the display apparatus. On the other hand, in PQ, display luminance is handled or considered as absolute values, with the maximum being 10000 nits (or $cd/m^2$), as illustrated in FIG. 4A, and thus the display peak luminance is fixed regardless of the display apparatus. Due to this, there are cases in which the display peak luminance of HDR images generated in compliance with PQ changes if capturing is performed in capturing modes in which the output dynamic range changes.

Figure 5:
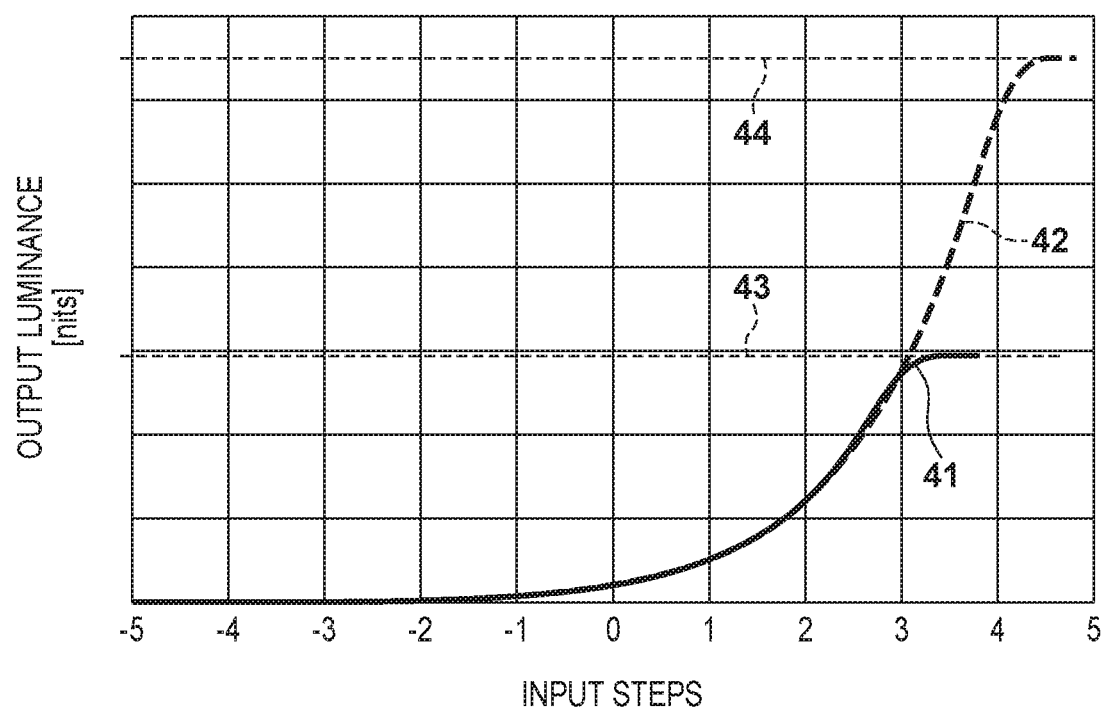
FIG. 5 is a diagram illustrating capturing modes with different output peak luminance and examples of corresponding gamma curves.

FIG. 5 illustrates examples of input/output characteristics (gamma curves) 41, 42 of two capturing modes in which the output dynamic range changes. The horizontal axis indicates input steps, and the vertical axis indicates output luminance. A comparison between the gamma curves 41, 42 of the capturing modes reveals that, while the gamma curves 41, 42 have the same characteristics outside the high luminance range where input steps are larger, the peak luminance 43 and the peak luminance 44 differ. Note that, in the present embodiment, it is supposed that signal characteristics of an HDR image conform to an EOTF (PQ for example) in which luminance is handled as absolute values, unless otherwise described. Accordingly, the signal processing circuit 25 generates HDR image data having luminance values that are in accordance with PQ.

Figure 3:
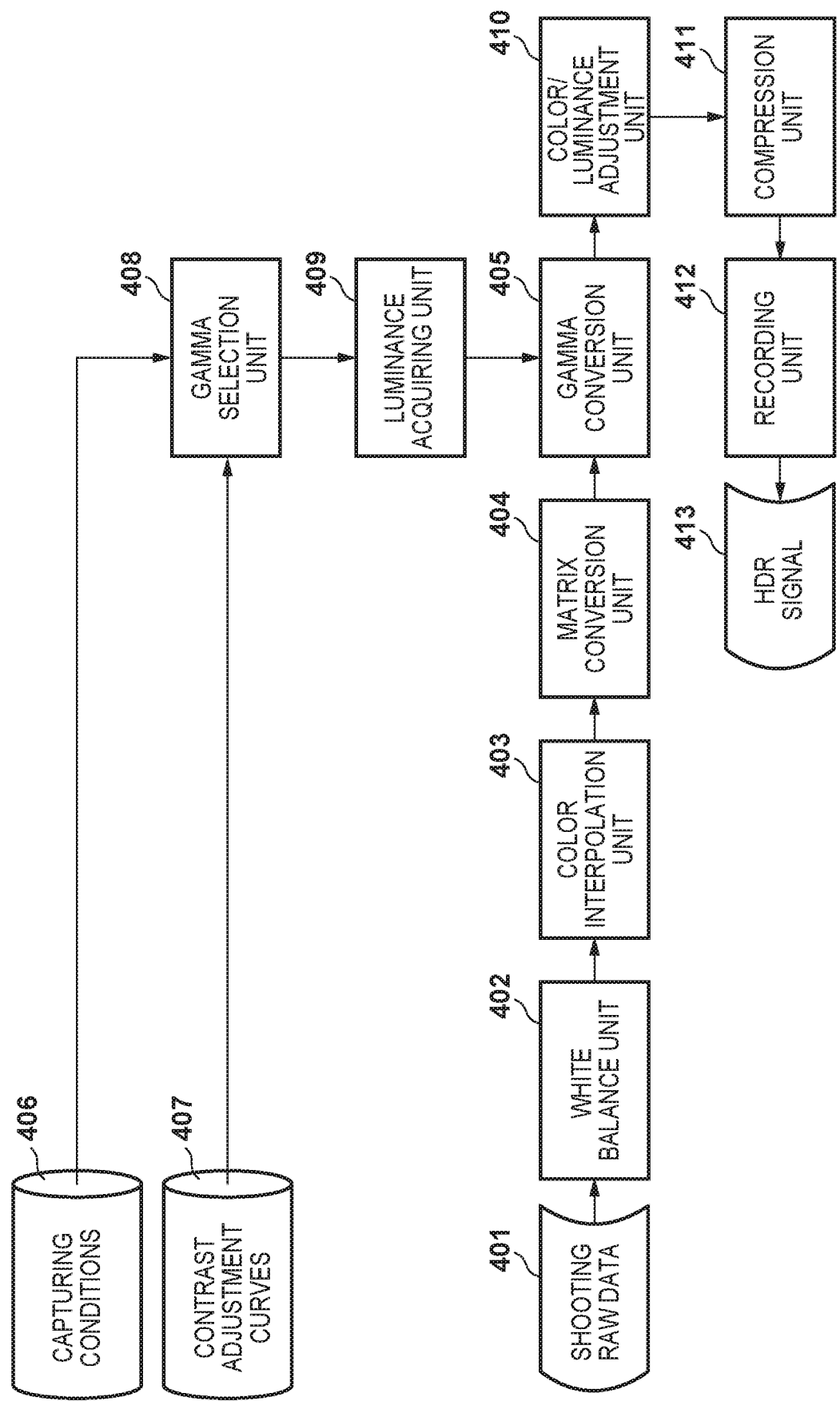
FIG. 3 is a functional block diagram for describing operations of a signal processing circuit 25 illustrated in FIG. 2.

The developing processing of the RAW image will be described using FIG. 3. In FIG. 3, processes performed by the signal processing circuit 25 are illustrated as functional blocks in 402 to 405, and 408 to 412. However, one or more of the functional blocks may be implemented by the control unit 21. Each piece of pixel data constituting the RAW image data 401 indicates the intensity of the color of the color filter provided in the corresponding pixel, and does not include information regarding other colors. Here, each pixel of the image sensor 10 is provided with a color filter of one of the colors red (R), green (G), and blue (B).

At the white balance unit 402, processing for reproducing whiteness by correcting color casts caused by the light source is performed. Specifically, the white balance unit 402 plots RGB data of the pixels constituting the RAW image data 401 on a predetermined color space, such as the xy color space, for example. Furthermore, the white balance unit 402 integrates R, G, B of data plotted near the blackbody radiation locus having a high possibility of being the color of the light source in the color space, and calculates white balance coefficients G/R and G/B for the R and B components from the integrated values. The white balance unit 402 carries out white balance processing by applying the white balance coefficients to the image data.

At the color interpolation unit 403, a color image in which all pixels have a set of color information R, G, B is generated by means of noise reduction processing and color interpolation processing. By the generated color image passing through the matrix conversion unit 404 and the gamma conversion unit 405, a basic color image is generated. Here, the gamma conversion unit 405 uses a gamma curve (contrast adjustment curve 407) acquired by the luminance acquiring unit 409. The gamma curve for obtaining an HDR image is an inverse EOTF, and is the inverse of the PQ illustrated in FIG. 4A, for example. Note that an optical-electro transfer function (OETF) obtained by combining an inverse EOTF and an opto-optical transfer function (OOTF) may be used.

<Peak Luminance>

In the camera 100, a plurality of capturing modes with different output dynamic ranges, such as those illustrated in FIG. 5, are prepared. The user can select an appropriate capturing mode in accordance with the contrast and brightness of the scene to be shot, the output luminance that the display on which the image that is shot is to be displayed is compatible with, etc., for example.

Here, the peak luminance in the present description is the possible or allowable maximum luminance value of developed image data, included in the number of luminance tones of the image data (which correspond to signal values of 0 to 1023 in the case of 10-bit image data). Furthermore, a dynamic range in which the signal value corresponding to the peak luminance is the maximum signal value is the output dynamic range. Accordingly, if the peak luminance is lower than 1023, the output dynamic range becomes narrower than the range of 0 to 1023 even in the case of an HDR signal.

The peak luminance is set in advance for each capturing mode. The camera 100 according to the present embodiment has a first mode and a second mode as HDR capturing modes, and the peak luminance is higher in the second mode than in the first mode. For example, in the example illustrated in FIG. 5, the gamma curve 41 having the peak luminance 43 corresponds to the input/output characteristics of the first mode, and the curve 42 having the peak luminance 44 corresponds to the input/output characteristics of the second mode. In the present embodiment, the peak luminance in the first mode is set in advance to 288 nits (with a corresponding signal value of 632), and the peak luminance in the second mode is set in advance to 648 nits (with a corresponding signal value of 721).

In a case in which luminance is handled as absolute values as in the present embodiment, display luminance is not dependent on the display apparatus, and thus the relationship between display luminance and signal values can be specified. Accordingly, the difference in peak luminance between capturing modes becomes a difference in output D range. In the present embodiment, a signal value corresponding to the peak luminance (or that is, the peak luminance value [nits]) is referred to as a maxDRL (maximum Dynamic Range Level). The maxDRL in the first mode is 632, and the maxDRL in the second mode is 721. If luminance values in an HDR image have a 10-bit tone, the dynamic range of signal values is 0 to 1023. However, the maxDRL is smaller than 1023 in both the first mode and the second mode.

If the difference in peak luminance is the difference in output dynamic range, there are cases in which the output dynamic range varies depending on sensitivity (ISO sensitivity). The amount of charge relative to photo-diode capacity would be less in a case in which capturing is performed with a sensitivity (ISO 200 for example) for which a gain is applied by the image sensor 10 compared to a case in which capturing is performed with a standard sensitivity (ISO 100 for example) for which a gain is not applied (signal values are not amplified) by the image sensor 10. Due to this, capturing with higher sensitivity results in a wider dynamic range. Note that the gain as mentioned herein may be an analog gain applied before A/D conversion or a digital gain applied after A/D conversion.

Furthermore, depending on the amplifier used for the application of gain, sensitivities at increments smaller than one EV (intermediate ISO sensitivities) are realized by increasing or decreasing the gain from typical sensitivities. In such a configuration, the saturation signal level decreases if the gain is decreased, and thus the dynamic range becomes narrower.

Figure 4B:
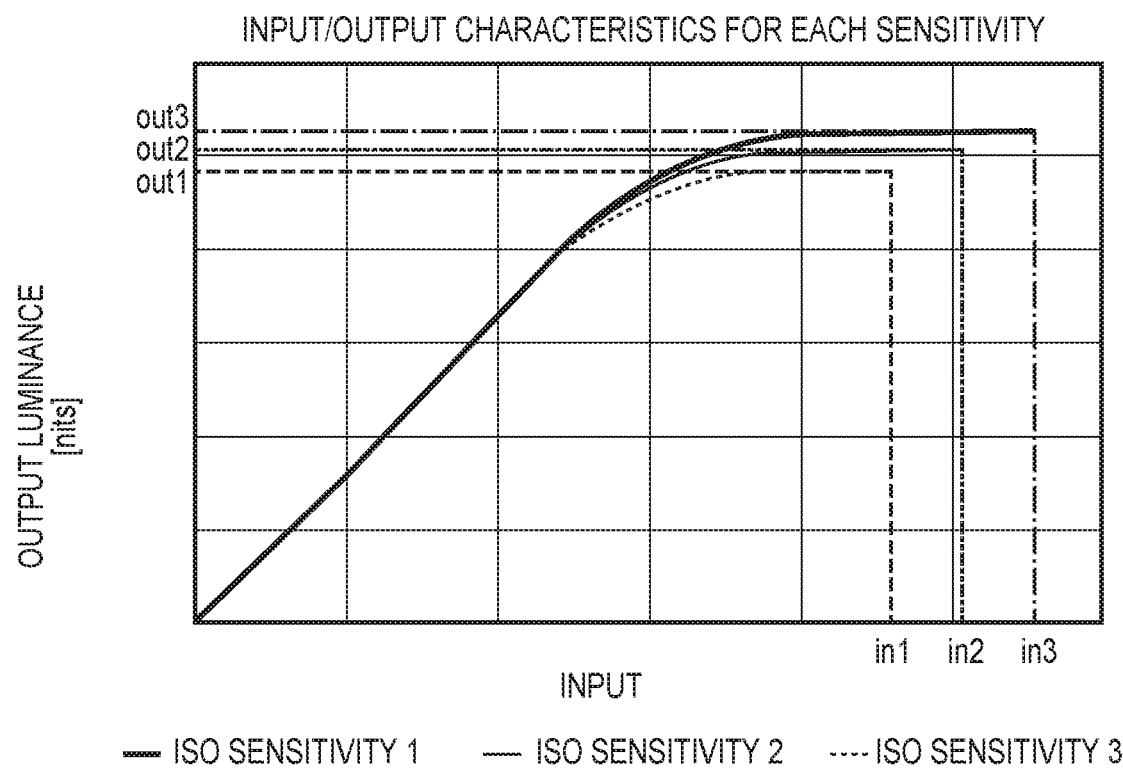

In such a manner, there are cases in which the peak luminance varies in accordance with capturing conditions, particularly the sensitivity. Accordingly, gamma curves corresponding to combinations of capturing modes and sensitivities are stored in advance in the ROM of the control unit 21 as contrast adjustment curves 407. FIG. 4B illustrates an example of gamma curves stored for a given capturing mode. The gamma curves correspond to three sensitivities. The gamma selection unit 408 acquires the currently-set capturing conditions 406 (the capturing mode and ISO sensitivity) by referring to the memory 28, for example. Furthermore, the gamma selection unit 408 acquires one of the contrast adjustment curves 407 that corresponds to the acquired capturing conditions (the combination of the capturing mode and ISO sensitivity) from the control unit 21, and outputs the contrast adjustment curve 407 to the luminance acquiring unit 409.

The luminance acquiring unit 409 supplies the acquired contrast adjustment curve 407 to the gamma conversion unit 405. Also, the luminance acquiring unit 409 acquires the absolute luminance for a plurality of output values including the maximum output value in the contrast adjustment curve 407. The absolute luminance can be calculated from the PQ EOTF (FIG. 4A) standardized by SMPTE ST 2084. Furthermore, the luminance acquiring unit 409 stores the maximum output value in the contrast adjustment curve 407 or the absolute luminance [nits] (maxDRL) corresponding to the maximum output value to the memory 28, for example. The absolute luminance corresponds to out1 to out3 in FIG. 4B.

The color/luminance adjustment unit 410 applies image processing for improving image appearance to the color image data that the gamma conversion unit 405 generated by performing gamma conversion. For example, the color/luminance adjustment unit 410 applies scene detection processing to the color image, and if it is determined that the color image is a predetermined scene, applies image processing associated with the scene. For example, if it is determined that the color image is an evening scene, the color/luminance adjustment unit 410 applies image processing for emphasizing chroma to the color image data.

The image data output by the color/luminance adjustment unit 410 is encoded by the compression unit 411 in order to reduce the data amount. For example, the encoding method may be a method conforming to the HEVC standard, but other methods are also applicable. The recording unit 412 generates a data file of a predetermined format storing the encoded image data. Furthermore, the recording unit 412 includes a description of the maxDRL acquired by the luminance acquiring unit 409 for the contrast adjustment curve 407 selected by the gamma selection unit 408 as metadata of the data file in the header, for example. In such a manner, the recording unit 412 generates and outputs an HDR signal 413. Note that the recording unit 412, when generating an image for displaying, may store image data to the memory 28 in a state in which the image data is associated with the maxDRL, without storing the image data in a data file.

<Highlight Alarm Indication>

Next, an operation for providing a highlight alarm indication will be described. A highlight alarm indication in the present embodiment is a function that enables the user to recognize a "region that is a blown-out highlight" or a "region that is almost a blown-out highlight" in an image under the current capturing conditions. Note that a region that is a blown-out highlight is a region in which luminance is saturated, and thus it is difficult to restore the tone in the region by means of image processing. Due to this, by notifying the user of a region that is a blown-out highlight and a region that is almost a blown-out highlight, the user can change the exposure conditions so that regions that will become blown-out highlights are reduced if the blown-out highlights are not intended. Furthermore, if a blown-out highlight is intended, it can be checked whether the intended region will become a blown-out highlight and the exposure conditions can be changed so that the intended region becomes a blown-out highlight.

In particular, HDR images conforming to an HDR standard in which luminance is handled as absolute values have a specific problem in connection with highlight alarm indications. In the case of an SDR image or an HDR image conforming to an HDR standard in which luminance is indicated in relative values, the display peak luminance is a value that is in accordance with the capability of the output device. Accordingly, it suffices to set a value (248 for example) that is close to the maximum value (255 if the bit depth is 8 bits) in image data as a threshold and to provide a highlight alarm for a pixel having a value greater than or equal to the threshold. By adopting such a configuration, highlight alarm indications can always be provided to a high luminance range (for example, 2% in the high luminance range-side of the dynamic range) that covers a predetermined proportion of the dynamic range of an entire image.

However, in the case of an HDR image conforming to an HDR standard, such as the PQ system, in which luminance is handled as absolute values, a value of image data corresponds to a fixed display luminance. Therefore, there are cases in which the desired result cannot be obtained by providing a highlight alarm based on a fixed threshold. For example, consider a case in which highlight alarms are provided based on a fixed threshold corresponding to the peak luminance 44 in the second capturing mode in the example illustrated in FIG. 5. In this case, highlight alarms using the fixed threshold can be provided for HDR image data shot in the second capturing mode, similarly to an SDR image. However, no highlight alarms will be provided at all for HDR image data shot in the first capturing mode because the fixed threshold is greater than the peak luminance 43. In order to deal with such a problem, highlight alarms are provided using a threshold based on the maxDRL in the present embodiment.

Figure 6:
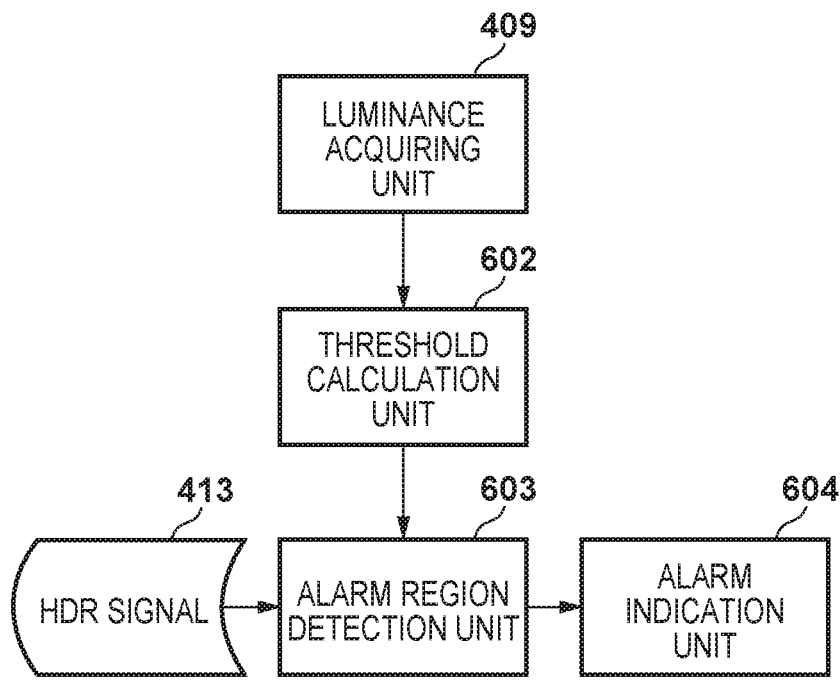
FIG. 6 is a functional block diagram relating to an operation, in the embodiments, for providing a highlight alarm indication to an HDR signal.
Figure 7:
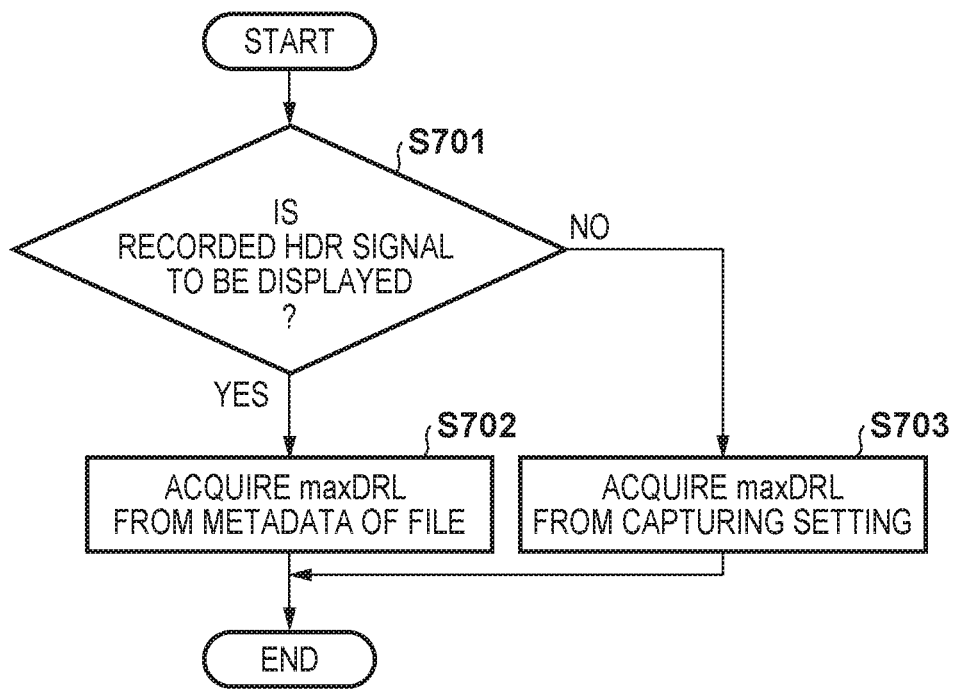
FIG. 7 is a flowchart relating to a maxDRL calculation operation in the embodiments.

In the following, the operation, according to the present embodiment, for providing a highlight alarm indication will be described using FIG. 6 and FIG. 7. FIG. 6 is a diagram in which operations of the signal processing circuit 25 relating to the provision of a highlight alarm indication based on the HDR signal 413 are illustrated as functional blocks. The signal processing circuit 25 executes the following operations if the provision of highlight alarm indications is turned on when performing displaying based on the HDR signal 413 generated through the processing described using FIG. 3. Note that one or more of the functional blocks 601 to 604 illustrated in FIG. 6 may be realized by the control unit 21 executing a program stored in the ROM.

In step S701, the luminance acquiring unit 409 determines whether a recorded HDR signal stored in the storage unit 26 is to be displayed or an HDR signal that is not recorded (that is being shot), such as a live-view image, is to be displayed. The luminance acquiring unit 409 advances processing to step S702 if it is determined that a recorded HDR signal is to be displayed, and advances processing to step S703 if it is determined that an HDR signal that is not recorded is to be displayed.

In step S702, the threshold calculation unit 602 acquires the maxDRL a description of which is included in the metadata of the data file in which the HDR signal to be displayed is recorded. Also, in step S703, the threshold calculation unit 602 acquires, from the memory 28 for example, the maxDRL acquired by the luminance acquiring unit 409 from the contrast adjustment curve 407 that the gamma selection unit 408 selected in accordance with the current capturing conditions (the capturing mode and sensitivity). Then, the threshold calculation unit 602 calculates a highlight alarm threshold corresponding to the maxDRL.

One example of a calculation method of the highlight alarm threshold will be described. In the present embodiment, the ICtCp color space, which is one perceptually-uniform color space and is standardized by ITU-R BT.2100, is used, similarly to the provision of highlight alarm indications to an SDR signal. Suppose that maxSDR is the possible maximum value of an SDR signal, and thrS is a threshold (SDR signal threshold) to be used to provide highlight alarms to an SDR signal. For example, suppose that the bit depth of an SDR signal is 8 bits, and that maxSDR and thrS are set beforehand to 255 and 248, respectively, and are stored to the ROM of the control unit 21, for example. Here, an I value (luminance value) obtained by converting RGB values (Xr, Xg, Xb) of a given pixel X into a value in the ICtCp color space is denoted as I(X).

Here, if ΔI is defined as the difference between the I values corresponding to maxSDR and thrS, ΔI can be calculated according to Formula 1 below.

$$\Delta I = I(\text{maxSDR}) - I(\text{thrS}) \qquad \text{Formula 1}$$

The threshold calculation unit 602 calculates an I value I(thrH1) corresponding to a highlight alarm threshold thrH1 to be used for the HDR signal, according to Formula 2 below.

$$I(\text{thrH1}) = I(\text{maxDRL}) - \Delta I \qquad \text{Formula 2}$$

Furthermore, by inversely converting I(thrH1) into a value in the RGB color space, the threshold thrH1 for RGB values can be calculated.

In such a manner, the difference ΔI between the threshold for the HDR image and the maximum value in the HDR image and the difference ΔI between the threshold for an SDR image and the maximum value in an SDR image are made equal. By adopting such a configuration, indications of highlight alarms are provided such that the difference between the brightness at which the provision of highlight alarms is started and the possible maximum brightness of the image is the same for an SDR image and the HDR image. Due to this, regardless of whether an image is an SDR image or an HDR image, indications of highlight alarms are provided at regions having levels of brightness for which the degree by which the brightness is perceived by the user as a blown-out highlight is similar.

Next, the alarm region detection unit 603 (detecting means) detects a highlight-alarm target region (pixel) by applying the threshold thrH1 to the HDR signal to be displayed and performing threshold processing. For example, the alarm region detection unit 603 specifies a pixel having a value greater than or equal to the threshold thrH1 as an alarm target pixel. Here, the alarm region detection unit 603 calculates an alarm map mapH obtained by binarizing the HDR image according to whether each pixel is a highlight-alarm target or not. For example, FIG. 8B illustrates an example of an alarm map mapH obtained for the HDR image illustrated in FIG. 8A. FIG. 8B illustrates an example of an alarm map mapH in which pixels that are alarm targets are 1 (white) and pixels that are not alarm targets are 0 (black).

Note that, in the calculation of the alarm map mapH, the threshold thrH1 may be converted into a value in the RGB space, and threshold processing may be performed individually on the R, G, B values of the HDR image data. In this case, for all components R, G, B, a pixel having a value greater than or equal to the threshold is specified as an alarm target pixel. Alternatively, a conversion from the RGB color space into the YCbCr color space may be applied to the HDR image data, and the threshold thrH1 may be then applied to the luminance signal Y. The threshold processing may also be performed according to other methods.

The alarm indication unit 604 (display controlling means) adds alarm indications to the HDR image based on the alarm map mapH generated by the alarm region detection unit 603. The method for providing alarm indications is not particularly limited, and any method allowing the visual distinction of regions can be used. For example, a specific pattern such as a zebra pattern can be displayed (at all times or periodically) in a superimposed state on a target region, pixel values within a target region can be changed (at all times or periodically) to a specific value, or pixels within a target region can be displayed in a flickering state. These are merely examples, and any method allowing the visual distinction between a target region and non-target region can be used. The alarm indication unit 604 can realize highlight alarm indications by writing pattern data in a region of the memory 28 that is being used as a VRAM, by changing pixel values, etc. FIG. 8C illustrates an example of a state in which a highlight alarm indication based on the alarm map mapH in FIG. 8B has been provided.

As described above, according to the present embodiment, a configuration is adopted such that, in a case in which highlight alarm indications are to be provided to HDR image data conforming to an HDR standard in which luminance values are handled as absolute values, a threshold that is in accordance with the maximum value in the image data is used. Due to this, appropriate highlight alarm indications can be provided even in a case in which the peak luminance differs depending on the capturing mode.

Second Embodiment

Next, the second embodiment of the present invention will be described. The present embodiment differs from the first embodiment in terms of the operation of the threshold calculation unit 602. Accordingly, how a highlight alarm threshold thrH2 in the present embodiment is calculated will be described in the following.

In the present embodiment, the threshold calculation unit 602 calculates the highlight alarm threshold for an HDR signal so that the ratio is the same as that between the maximum output value maxSDR and the highlight alarm threshold thrS of an SDR signal.

The threshold calculation unit 602 acquires the maxSDR and the thrS from the ROM of the control unit 21, and calculates a ratio r according to Formula 3 below.

$$r = \text{thrS}/\text{maxSDR} \qquad \text{Formula 3}$$

Furthermore, the threshold calculation unit 602 calculates the highlight alarm threshold thrH2 for the HDR signal according to Formula 4 below.

$$\text{thrH2} = r \times \text{maxDRL} \qquad \text{Formula 4}$$

By using the highlight alarm threshold thrH2, highlight alarm indications can be provided in each of an SDR signal and an HDR signal to pixels having a value of a same ratio or more relative to the corresponding maximum output value.

Third Embodiment

Next, the third embodiment of the present invention will be described. The present embodiment differs from the first and second embodiments in terms of the operation of the threshold calculation unit 602. Accordingly, how a highlight alarm threshold thrH3 in the present embodiment is calculated will be described in the following.

In the present embodiment, the threshold calculation unit 602 uses signal values before the gamma conversion processing, or that is, signal values from the image sensor 10.

Figure 9:
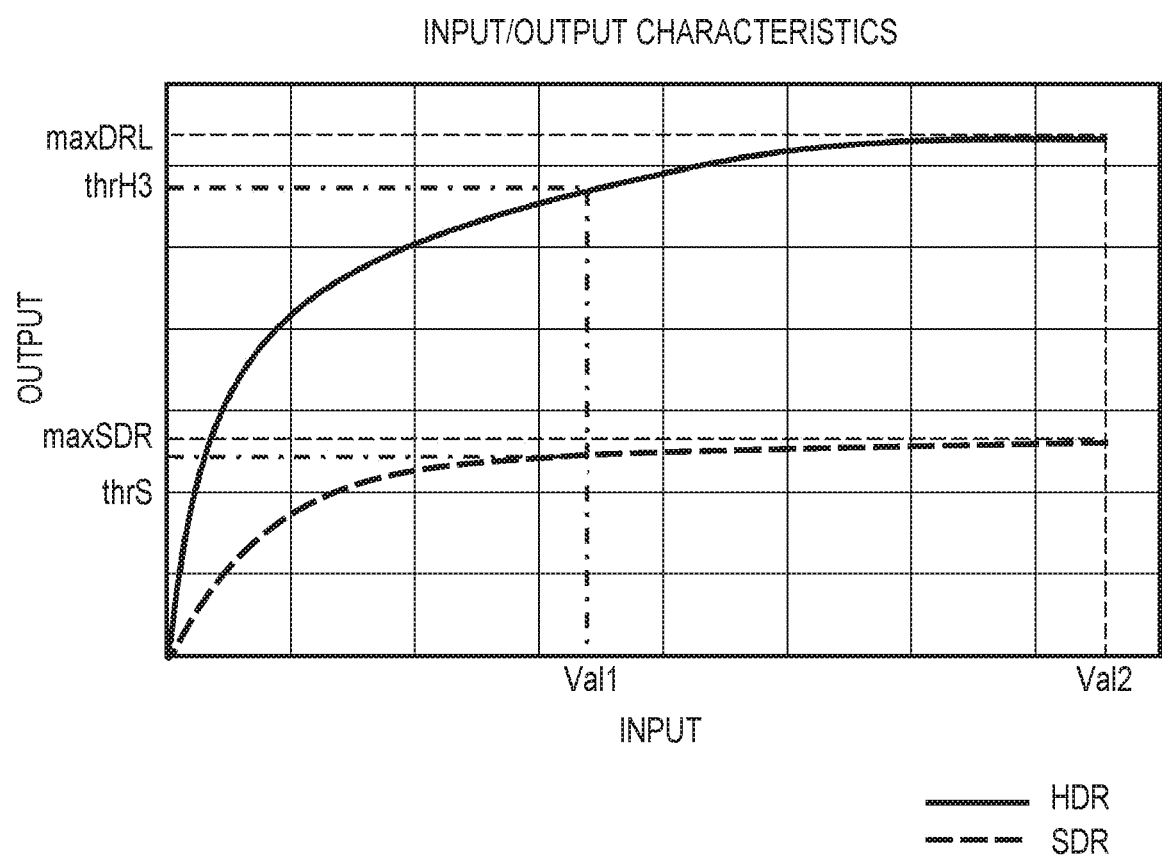
FIG. 9 is a diagram illustrating examples of gamma curves for calculating a highlight alarm threshold pertaining to a third embodiment.

FIG. 9 illustrates an example of input/output characteristics of contrast adjustment curves 407 (gamma curves) applied by the gamma conversion unit 405 to an SDR image and an HDR image. In FIG. 9, Val2 indicates the saturation signal value of the image sensor 10. Val1 indicates a signal value of the image sensor 10 corresponding to the highlight alarm threshold thrS for an SDR signal.

The threshold calculation unit 602 calculates the output value obtained when the input value Val1 is converted by the contrast adjustment curve 407 applied to an HDR image as the highlight alarm threshold thrH3 for an HDR signal.

By using such a highlight alarm threshold thrH3, highlight alarm indications can be provided to pixels whose signal values before gamma conversion are within the same range in both an SDR signal and an HDR signal. Due to this, highlight alarms can be provided for the same regions of an SDR signal and an HDR signal.

Fourth Embodiment

Next, the fourth embodiment of the present invention will be described. The present embodiment differs from the first to third embodiments in terms of the operation of the threshold calculation unit 602. Accordingly, how a highlight alarm threshold thrH4 in the present embodiment is calculated will be described in the following.

In the first to third embodiments, highlight alarm thresholds obtained by different calculation methods are used. However, these highlight alarm thresholds may be used in combination. In the present embodiment, the threshold calculation unit 602 calculates a highlight alarm threshold using two or more of the thresholds calculated in the first to third embodiments.

Here, a case in which a highlight alarm threshold is calculated by performing weighted addition of the thresholds calculated in the first to third embodiments and further adding a constant will be described. When constants are denoted as $\alpha 1$, $\alpha 2$, $\alpha 3$, and $\beta 1$, the threshold calculation unit 602 calculates the highlight alarm threshold thrH4 according to Formula 5 below.

$$thrH4=\alpha 1\times thrH1+\alpha 2\times thrH2+3\times thrH3+\beta 1 \quad \text{Formula 5}$$

By adjusting the constants $\alpha 1$, $\alpha 2$, and $\alpha 3$, which are weights provided to the thresholds, and the remaining constant $\beta 1$, highlight alarm indications taking the post-gamma conversion output dynamic range and the pre-gamma conversion dynamic range of the image sensor 10 into consideration at a good balance can be realized. The constants can be set through trial and error, for example.

Fifth Embodiment

Next, the fifth embodiment of the present invention will be described. In the first to fourth embodiments, methods for providing highlight alarm indications to an HDR signal have been described. There are cases in which a display on which a generated HDR signal is to be displayed is only compatible with SDR signals. In the present embodiment, highlight alarm indications that are in accordance with the display environment of an HDR signal are realized.

A highlight alarm threshold for an HDR signal to be displayed is calculated in accordance with one of the first to fourth embodiments using the threshold calculation unit 602, and further, a corresponding alarm map mapH is calculated in advance using the alarm region detection unit 603. If the display destination of the HDR signal is only compatible with SDR signals, the alarm indication unit 604 performs tone mapping of the HDR signal to an SDR signal. Note that, while a method of converting the HDR signal into a linear signal using the inverse of the gamma conversion performed in the developing and further performing gamma conversion for developing an SDR signal, etc., can be considered as one example of the tone mapping method, a different method may be used.

Furthermore, the alarm indication unit 604 provides a highlight alarm indication to a highlight region in the created SDR signal that is indicated by the alarm map mapH. Note that, if the display 27 is an external device for example, the capability of the display destination can be acquired by communication with the control unit 21 when the display 27 is connected. Furthermore, a configuration may be adopted such that tone mapping is performed if SDR displaying is selected by user configuration.

According to the present embodiment, even if the apparatus that is to display an HDR signal is not compatible with HDR signals and can only display the HDR signal as an SDR signal, highlight alarm indications can be realized at the same regions as in the case in which the HDR signal is displayed on a display apparatus compatible with HDR signals.

Sixth Embodiment

In the first to fourth embodiments, one type of highlight alarm indication is provided based on one highlight alarm threshold. In the present embodiment, highlight alarm indications in multiple grades are provided using a plurality of thresholds.

The method for calculating the plurality of thresholds is not particularly limited, as long as a graded relationship is satisfied. For example, the thresholds obtained in the first to fourth embodiments may be combined. Here, a method for calculating thresholds in a graded manner using one method (for example, the method described in the first embodiment) will be described.

For example, the threshold calculation unit 602 can calculate highlight alarm thresholds thrH6_1 and thrH6_2 having different grades by increasing the number of times $\Delta I$ is subtracted in the first embodiment, as in Formula 6 and Formula 7. Here, I(thrH6_1) is equal to I(thrH1) used in the first embodiment.

$$I(thrH6\_1)=I(\text{maxDRL})-\Delta I \quad \text{Formula 6}$$

$$I(thrH6\_2)=I(thrH6\_1)-\Delta I \quad \text{Formula 7}$$

By performing inverse conversion of I(thrH6_1) and I(thrH6_2) onto the RGB color space, the thresholds thrH6_1 and thrH6_2 for RGB values can be calculated.

The alarm region detection unit 603 creates an alarm map for each threshold. Note that alarm maps can be generated in order from the greatest threshold, and an alarm map for the next threshold can be generated while regarding pixels that were already determined as alarm targets as pixels that are not alarm targets.

Based on the individual alarm maps, the alarm indication unit 604 provides highlight alarm indications that visually differ depending on the grades.

In the present embodiment, a configuration in which two thresholds are determined using the method according to the first embodiment and used has been described as one example. However, the number of thresholds may be three or more, and the method for determining the thresholds of multiple grades is not limited to the method according to the first embodiment. For example, the methods described in the first to fourth embodiments may be combined and used, as appropriate. Furthermore, a configuration may be adopted such that highlight alarm indications in multiple grades are provided by applying a plurality of thresholds after tone mapping of an HDR signal to an SDR signal is performed as in the fifth embodiment.

According to the present embodiment, alarm indications in multiple grades can be provided to highlight portions, and the user can recognize the distribution of highlights in an image in more detail.

Other Embodiments

Functions relating to capturing are not necessary for the above-described operation for providing highlight alarm indications. Accordingly, the above-described embodiments can be implemented in a display apparatus, such as a display, that displays images shot by a camera, or a control apparatus, such as a personal computer, that controls the displaying of images on a display apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-85797, filed on Apr. 26, 2019, which is hereby incorporated by reference herein in its entirety.

What is claimed is:

1. An image processing apparatus comprising:
one or more processors that execute a program stored in a memory and thereby functions as:
an acquiring unit configured to acquire a high dynamic range (HDR) signal generated in compliance with an HDR standard;
a detecting unit configured to detect a region for which a highlight alarm indication is to be provided, by applying a threshold to the HDR signal; and
a display controlling unit configured to provide a highlight alarm indication for the region detected by the detecting unit,
wherein the HDR standard is a standard in which luminance values are handled as absolute values, and
wherein the detecting unit applies a threshold that is based on a possible maximum value of the HDR signal.

2. The image processing apparatus according to claim 1, wherein the acquiring unit acquires information regarding the possible maximum value along with the HDR signal.

3. The image processing apparatus according to claim 1, wherein the HDR signal is obtained by image capturing, and the possible maximum value is in accordance with capturing conditions of the HDR signal.

4. The image processing apparatus according to claim 1, wherein the image processing apparatus is an image capture apparatus, and the threshold is based on capturing conditions currently being set.

5. The image processing apparatus according to claim 3, wherein the capturing conditions include a sensitivity.

6. The image processing apparatus according to claim 1, wherein the threshold is set so that a highlight alarm indication is provided to a region of the HDR signal that has brightness similar to brightness for which a highlight alarm indication is provided for a standard dynamic range (SDR) signal.

7. The image processing apparatus according to claim 1, wherein the threshold is set so that a difference between a first brightness of a signal at which the provision of a highlight alarm indication is started and a possible maximum brightness of the signal, is to be similar for the HDR signal and an SDR signal.

8. The image processing apparatus according to claim 1, wherein the threshold is a value obtained by multiplying the possible maximum value of the HDR signal by a ratio of an SDR signal threshold that is used for providing a highlight alarm indication to an SDR signal to a possible maximum value of the SDR signal.

9. The image processing apparatus according to claim 1, wherein the threshold is an output value of a gamma curve used to generate the HDR signal, wherein the output value is for an input value that corresponds to an SDR signal threshold that is used for providing a highlight alarm indication for an SDR signal.

10. The image processing apparatus according to claim 1, wherein the threshold is obtained by combining, at a predetermined ratio, two or more of:
a value set so that a highlight alarm indication is provided for a region of the HDR signal that has brightness similar to brightness for which a highlight alarm indication is provided in an SDR signal;
a value set so that a difference between a first brightness of a signal at which the provision of a highlight alarm indication is started and a possible maximum brightness of the signal, is to be similar for the HDR signal and an SDR signal;
a value obtained by multiplying the possible maximum value of the HDR signal by a ratio of an SDR signal threshold that is used for providing the highlight alarm indication to the SDR signal to a possible maximum value of the SDR signal; and
a value that is an output value of a gamma curve used to generate the HDR signal, wherein the output value is for an input value that corresponds to the SDR signal threshold that is used for providing the highlight alarm indication for the SDR signal.

11. The image processing apparatus according to claim 1, wherein the detecting unit applies a plurality of thresholds, and
wherein the display controlling unit provides highlight alarm indications respectively corresponding to the plurality of thresholds.

12. The image processing apparatus according to claim 1, the one or more processors further functions as a conversion unit configured to convert the HDR signal into an SDR signal, and wherein the display controlling unit provides the highlight alarm indication for a region of the SDR signal corresponding to the region in the HDR signal detected by the detecting unit.

13. A method for controlling an image processing apparatus, comprising:

acquiring an HDR signal generated in compliance with an HDR standard;

detecting a region for which a highlight alarm indication is to be provided, by applying a threshold to the HDR signal; and providing a highlight alarm indication for the region detected by the detecting, wherein the HDR standard is a standard in which luminance values are handled as in absolute values, and wherein in the detecting, a threshold that is based on a possible maximum value of the HDR signal is applied.

14. A non-transitory computer-readable medium having stored therein a program for making a computer function as an image processing apparatus comprising:

one or more processors that execute a program stored in a memory and thereby functions as:

an acquiring unit configured to acquire a high dynamic range (HDR) signal generated in compliance with an HDR standard;

a detecting unit configured to detect a region for which a highlight alarm indication is to be provided, by applying a threshold to the HDR signal; and a display controlling unit configured to provide a highlight alarm indication for the region detected by the detecting unit, wherein the HDR standard is a standard in which luminance values are handled as absolute values, and wherein the detecting unit applies a threshold that is based on a possible maximum value of the HDR signal.

* * * * *